United States Patent [19]

Janecek

[11] Patent Number: 4,561,978

[45] Date of Patent: Dec. 31, 1985

[54] MULTIPLE PRIMARY ROLL

[75] Inventor: Kenneth F. Janecek, Salt Lake City, Utah

[73] Assignee: Envirotech Corporation, Menlo Park, Calif.

[21] Appl. No.: 659,189

[22] Filed: Oct. 9, 1984

[51] Int. Cl.[4] .............................................. B01D 33/02

[52] U.S. Cl. .................................... 210/401; 100/118; 162/205; 210/400

[58] Field of Search ................ 100/118, 120, 151–154; 162/205, 360.1; 210/770, 783, 400, 401

[56] References Cited

U.S. PATENT DOCUMENTS

| | | | |
|---|---|---|---|
| 3,315,370 | 4/1967 | Hikosaka | 100/118 X |
| 3,804,707 | 4/1974 | Mohr et al. | 162/358 |
| 3,897,341 | 7/1975 | Ozawa | 100/118 X |
| 3,906,853 | 9/1975 | Wohlfarter | 162/360.1 X |
| 3,942,433 | 3/1976 | Wohlfarter | 162/205 X |
| 3,951,805 | 4/1976 | Dodd | 210/400 X |
| 3,970,515 | 7/1976 | Busker | 162/360.1 |
| 4,019,431 | 4/1977 | Bastgen | 100/118 X |
| 4,053,419 | 10/1977 | Pav | 100/120 X |
| 4,086,131 | 4/1978 | Rempel et al. | 162/360.1 X |
| 4,144,807 | 3/1979 | Bastgen | 100/118 |
| 4,159,947 | 7/1979 | Brooks et al. | 210/401 X |
| 4,172,416 | 10/1979 | Hakansson | 210/401 X |
| 4,266,474 | 5/1981 | Bähr | 100/118 |
| 4,285,766 | 8/1981 | Kankaanpaa | 162/360.1 X |
| 4,475,453 | 10/1984 | Davis | 100/118 |
| 4,491,521 | 1/1985 | Wenske et al. | 210/401 |

FOREIGN PATENT DOCUMENTS

| | | | |
|---|---|---|---|
| 2016548 | 9/1979 | United Kingdom | 162/360 |

*Primary Examiner*—Robert Spitzer

*Attorney, Agent, or Firm*—Trask & Britt

[57] ABSTRACT

A dual-belt method and apparatus for dewatering a water laden cake of material through the use of multiple primary dewatering rolls is disclosed. A pair of porous belts containing filter cake disposed between the belts are wrapped around a first and second primary roll so that the belts circumscribe more than a 180° arc of each roll. The pressure applied to the belts, that is, to the filter cake, is greater on the second roll than on the first roll.

8 Claims, 1 Drawing Figure

MULTIPLE PRIMARY ROLL

BACKGROUND OF THE INVENTION

1. Field

The instant invention relates to dual-belt or dual-band filter presses employing multiple primary dewatering rolls or drums.

2. Prior Art

The filtering or dewatering of sewage, sludge and various other filter cake materials laden with water is conventionally accomplished through use of dual-belt or dual-band filters wherein the sludge is disposed between the two porous filter belts. The belts are passed around one or more primary rolls for the purpose of pressing the belts together to withdraw water through the belts and into the primary rolls or drums to dewater the filter cake. Such technique and apparatus are described in the following representative patents: U.S. Pat. No. 4,144,807 of Bastgen, entitled "Device For Dewatering Sludge"; U.S. Pat. No. 3,804,707 of Mohr et al, entitled "Papermaking Press With Inflatable Rolls Having Thin Deformable Outer Shells"; U.S. Pat. No. 4,159,947 of Brooks et al, entitled "Dewatering System"; U.S. Pat. No. 3,942,433 of Wohlfarter, entitled "Roller Arrangement in Presses For The Removal of Water From Materials"; U.S. Pat. No. 4,266,474 of Bahr, entitled "Chamber Type Filter Press For De-Watering Sludges And Similar Substances"; U.S. Pat. No. 4,053,419 of Pav, entitled "Band Filter Press"; U.S. Pat. No. 3,897,341 of Ozawa, entitled "Filter"; U.S. Pat. No. 3,906,853 of Wohlfarter, entitled "Roller Arrangement In Presses For the Removal of Water From Materials"; U.S. Pat. No. 3,951,805 of Dodd, entitled "Algae Harvester"; and U.S. Pat. No. 3,315,370 of Hikosaka, entitled "Continuous Dehydrating Apparatus".

RELATED APPLICATIONS

This application is commonly assigned with pending patent application Ser. No. 341,728 filed Jan. 26, 1982, now U.S. Pat. No. 4,475,453 entitled "Liquid Solid Separation Utilizing Pressure Rolls Covered With Elastomeric Layers" filed in behalf of Steven S. Davis. The specification of said patent is incorporated herein by reference.

OBJECTS OF THE INVENTION

It is an object of the instant invention to provide a multiple-drum, dual-belt filtering apparatus effective for the dewatering of filter cakes having readsorption characteristics.

It is another object of the instant invention to provide a multiple-roll, dual-band filtering apparatus having substantially balanced forces upon the bearings supporting each primary dewatering drum.

It is a further object of the instant invention to provide a dual-band filtering apparatus having discrete dewatering zones of sequentially increased pressure.

DESCRIPTION OF THE INVENTION

Figure 1:
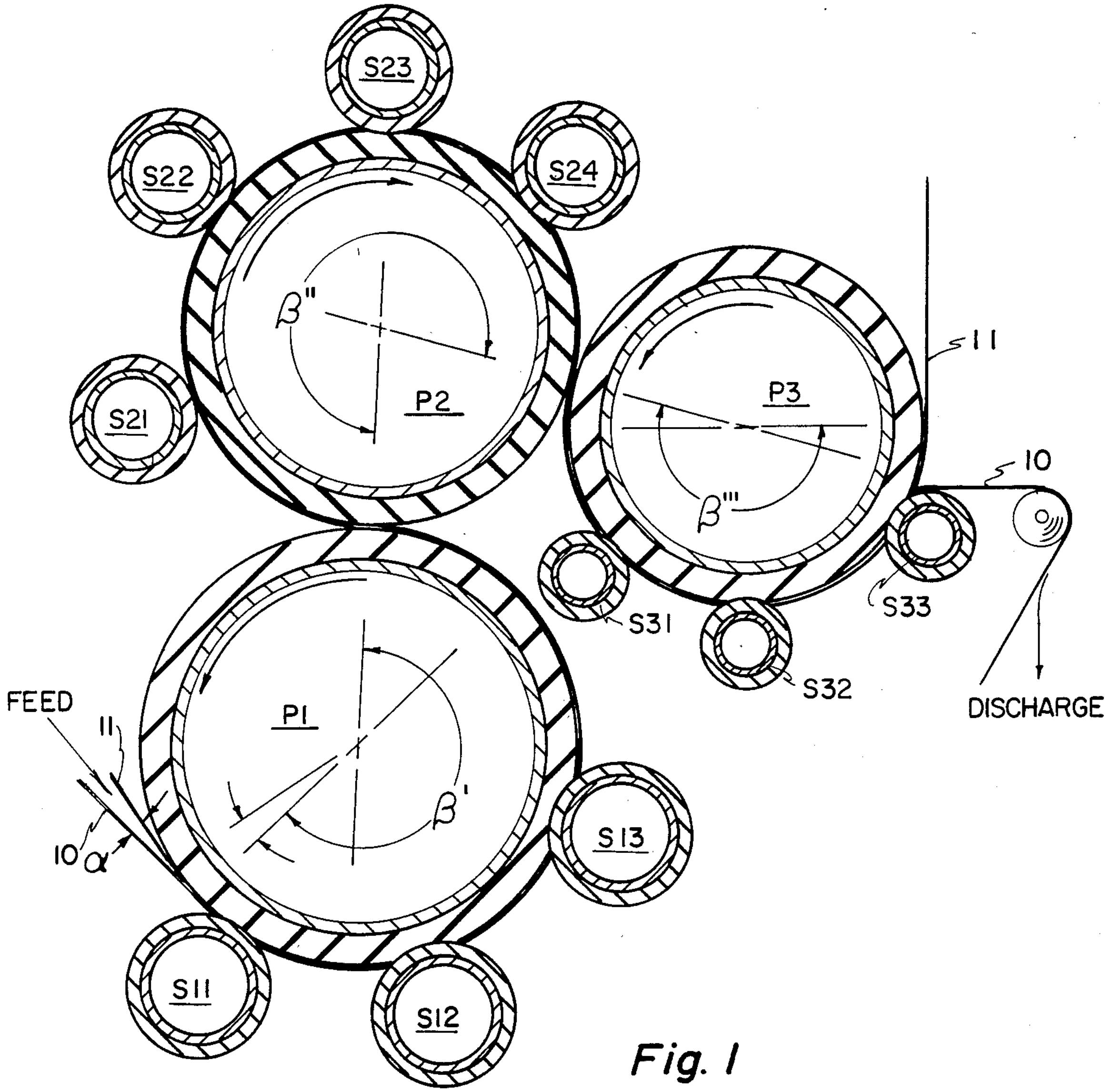
FIG. 1 is a schematic drawing of a multiple primary roll dual-band filter apparatus.

A unique method and apparatus for dewatering a water-laden cake of solid, particulate material has been invented. The technique involves introducing a water-laden cake between a pair of flat-faced porous belts or bands. The belts are passed through a first dewatering stage while pressing one belt, a first belt, against said cake and a second belt over an arc of travel greater than 120° and preferably greater than 150° in a certain first pressure zone to dewater the cake. This first pressure zone may contain a pressure variation within the zone. The belts are passed from said first dewatering stage through a second dewatering stage wherein the second belt becomes the pressure belt and is caused to press against said cake and said first belt over an extended arc of travel greater than at least 120°. The first belt and the cake, in the second dewatering zone, receive pressure from the second belt at a pressure which is greater than the average pressure applied in the first dewatering zone.

The belts are then passed through a third dewatering zone wherein the first belt is again the belt applying pressure. The pressure applied in the third dewatering zone is greater than the pressure applied in the second dewatering zone.

A particular apparatus useful for carrying out the unique technique of the instant invention comprises dual continuous filter belts which are porous or have a sufficiently open structure for supporting a filter cake but permitting water to pass through the belts. The belts pass from a feed position around a first cylindrical primary roll or drum having dewatering means. The dewatering drum is either porous or has grooves or other means for carrying away water removed from the filter cake. One or more satellite or planetary rolls are utilized in connection with the first primary drum. The satellite roll has a diameter significantly smaller than the primary roll. The primary drum and the satellite roll or rolls are preferably covered with an elastomeric material. More than one satellite roll is generally utilized per primary roll and it is generally preferred that each successive satellite roll which the belts encounter in passing around a primary drum has an increased hardness of surface. This may be done by employing a rubber of greater durometer than the preceding satellite roll or by using a rubber of a similar durometer but of a thinner covering so that the steel substrate is more readily discerned.

The parallel flat belts preferably wrap around the first primary roll over an arc which is greater than 120°.

The belts proceed from the first primary roll about a second primary roll wherein the belt which was in direct contact with the first primary roll is now on the outside and the outermost belt with reference to the first primary roll is now on the inside and in contact with the second primary roll. The belts preferably wrap around the second primary drum more than 120° before being directed to a third primary roll or to a discharge zone.

At least one satellite roll is in contact with the belts passing about the second primary drum. The second primary drum and its satellite rolls are preferably rubber covered with each successive satellite roll which the belts encounter having a harder surface.

Further description of the invention may be facilitated by reference to the attached drawing. In FIG. 1, belts 10 and 11 are directed from a feed zone into the nip formed between primary drum P1 and satellite roll S11. The belts preferably have a relatively long lead-in approach from the feed zone to the first primary drum. Preferably, the angle alpha between the two belts is from about one degree to about five degrees.

Satellite rolls S11, S12 and S13 associated with drum P1 are preferably positioned and fixed about the circumference of drum P1 in such a matter that the pressure exerted by each satellite roll successively increases as the belts pass from satellite roll S11 to satellite roll S13.

The two belts feed onto primary roll P1, preferably at a position whereby both belts are tangential prior to passing into the nip formed between satellite roll S11 and primary drum P1. The innermost belt first contacts the primary drum. The outermost belt (except for the presence of the cake and innermost belt) would contact the primary drum, i.e. it is tangent to the primary drum, at a point which is displaced by an arc equivalent to the angle alpha from the point of contact of the innermost belt. Also, it is preferred that primary drum P2 (the second primary drum) substantially contact drum P1 such that primary drum P2 exerts a compacting influence on the cake between belts 10 and 11 at the point of substantial contact between drum P1 and P2. Also, it is preferred that the point at which the belts lose contact with primary drum P1 is at an angle beta ($\beta'$) with respect to the first point of contact. Angle beta is generally more than 120° and preferably substantially more than 150°. (For purposes of this invention, angle beta is measured from point to point on a drum wherein the outermost belt is tangential to said drum.)

From FIG. 1 it can be seen that with respect to drum P1, the outermost belt is belt 10. A substantial tension on belt 10 will cause it to produce a compressive pressure upon the filter cake thereby squeezing water from the filter cake. Many filter cakes have elastic properties and upon being released from pressure tend to reabsorb moisture if moisture is still present in the belt or in some manner adjacent the filter cake.

An extended nip formed between a hard satellite roll and a relatively soft outer surface of a primary drum, the pressure being incrementally increased on successive satellite rolls, is utilized. Such an extended nip and successive increase of pressure minimizes any readsorption and/or reabsorption of water which may occur with respect to a particular kind of filter cake.

As can be further seen from FIG. 1, belt 10 becomes the inside belt as it passes around a second primary roll P2. Also, the belts complete a reverse wrap, that is, they are in contact or they wrap around a second primary roll P2 over an arc which significantly exceeds 120°. Satellite rolls S21, S22, S23 and S24 associated with primary roll P2 are preferably spaced about the drum P2 and in substantial contact with belt 11 passing about drum P2. Again, the pressure applied may increase succcessively from satellite roll S21 to satellite roll S22 to satellite roll S23 to satellite roll S24. Preferably, the durometer or hardness of the elastomers on the surface of the rolls also successively increase. Alternatively, the thickness of elastomer on successive rolls may be decreased. Thus, the nip formed between drum P2 and satellite roll S24 will be more extended than that formed between satellite roll S21 and drum P2.

In FIG. 1 a third dewatering drum P3 is illustrated. It is preferred that a third primary drum be included in the apparatus of the instant invention. The inner-outer relationship of the belts is reversed from drum P2 to drum P3 wherein the relative position of the belts with respect to drum P3 is the same as drum P1. Drum P3 preferably contacts drum P2 to place some pressure upon the filter cake, that is, the space between the tangential point of drum P2 and that of drum P3 is smaller than the thickness of the pair of belts and the filter cake thickness at this point in the travel of the belts through the apparatus.

The pair of belts frequently may not complete a reverse wrap of drum P3, i.e. have a contact angle beta''' greater than 120°, although the belts may complete a reverse wrap of drum P3, if desired.

Satellite rolls S31, S32 and S33 may successively place increased pressure upon drum P3. Belt 10 proceeds away from satellite roll S33 in a substantially horizontal direction to proceed to a discharge point for the filter cake. Belt 11 is separated from belt 10 and directed by idler rollers back to the feed zone of the apparatus.

In FIG. 1 the primary drums illustrated show a successive decrease in diameter in proceeding from primary drum P1 to primary drum P2 to primary drum P3. Also, the satellite rolls are significantly smaller in diameter than the primary drum with which each group of satellite rolls is associated. Further, it is generally preferred that the size, that is, the diameter of the satellite rolls decrease as the belts proceed from primary roll P1 to second primary roll P2 to the third primary roll P3.

Thus, satellite rolls S11, S12 and S13 are larger in diameter than the satellite rolls S21, et. seq., which in turn, are larger than the satellite rolls S31, et. seq.

The placement of numerous satellite rolls about a significant arc of each primary roll tends to minimize the transfer of unequal forces upon the bearings associated with each primary roll. For example, in FIG. 1, the force applied by primary roll P2 against primary roll P1 is substantially offset by the forces of satellite rolls S11 and S12. The force applied by satellite roll S13 to primary drum P1 is not countered and the displacement force on the bearings would thus be away from satellite roll S13. Although it is not illustrated, an additional satellite roll could be utilized with respect to primary drum P1 whereby the additional satellite roll would be directly opposed to satellite roll S13 so that there would be substantially no unequal forces upon the bearings supporting the shaft of primary drum P1. Such an opposed satellite roll would not be used for contacting the belts, but merely used to equalize bearing forces with respect to the bearings and main axle of a primary drum.

The same arrangement of satellite rolls may be made with respect to drum P2 to substantially minimize the wear upon bearings supporting drum P2.

The belts preferably wrap about primary drum P3 over an arc of at least about 120°. Thus, without any offsetting of satellite belts the forces upon the bearings of drum P3 would be substantially away from satellite rolls S31 and S32.

The instant invention is particularly useful with respect to filter cakes having an elastic or rebounding character whereby a release of pressure upon the filter cake permits it to reexpand and thereby to readsorb and/or reabsorb any moisture in the presence of the filter cake as it undergoes its reexpansion. Through the application of successively increased pressure upon the filter cake through the use of separate satellite rolls with respect to each primary roll and whereby the pressure successively increases on the satellite rolls, the filter cake is effectively dewatered.

As indicated earlier, the various drums and rolls utilized in the apparatus of the instant invention are covered in elastomeric compressible material such as rubber or rubber-like material. With respect to the various drums and rolls, a rubbery material having a durometer range as set forth as follows:

First primary roll—35 to 55;
Second primary drum—45 to 65;
Third primary drum—55 to 75;
Satellite rolls for first primary drum—25 to 55;
Satellite rolls for second primary drum—35 to 65;
Satellite rolls for third primary drum—45 to 75;

As further indicated hereinabove, the satellite rolls have a significantly smaller diameter than the primary rolls with which those satellite rolls interact. With respect to the first primary drum, the satellite rolls have a diameter which is about 25% to about 75% as large as the first primary drum. The ratio of diameters of the satellite rolls with respect to the second primary drum are about 30% to about 90%. The ratio of diameters of the satellite rolls with reference to the third primary drum are about 40% to about 100%.

The primary dewatering drums of the instant invention are preferably arranged in a descending order of size. The first primary drum is larger than the second primary drum, the second primary drum is larger than the third primary drum. Preferably, the ratio of sizes (diameters) is set forth as follows: First primary drum to second primary drum—2:1 to 1:1; second primary drum to third primary drum—2:1 to 1:1.

The primary dewatering drums generally have a diameter of from about thirty-six inches (36") to about sixty inches (60") and preferably from about forty-two inches (42") to about fifty-four inches (54"). Typical satellite rolls have a diameter of from about eight inches (8") to about thirty inches (30") and preferably from about twelve inches (12") to about twenty-four inches (24").

The elastomeric covering may be made of typical industrial grade elastomers such a neoprene, polyurethane, natural rubber and the like. The thickness of the elastomeric covering ranges from less than about one-half inch (½") to about one and one-half inches (1½") and preferably having a thickness of about one inch (1").

The invention described herein is particularly effective for dewatering water-laden cake which has a tendency to reabsorb water. Such cake consists of fine, particulate material having a solids content of from about 25% to about 75% by weight solid. The cake would generally be self-supporting, i.e. it would not slump. Wetter materials are usually pre-treated.

Typical particulate materials include paper pulp, cellulose fibers, mineral particles, metal oxide particles and the like. Particle size of material ranges below about 200 mesh.

A typical water-laden cake material may readily be dewatered from a solids content of about 10% to about 90% or more in a dual-belt filter press of the type described herein. The amount of water removed from a cake depends upon the initial water content, the type of particulate material in the cake, the particle size of the cake material, the particle distribution, and the amount of pressure involved in each dewatering zone.

The thickness or the depth of the water-laden cake may be a factor in determining final water content.

The cake material is packed by the forces within a nip, thereby eliminating interstitial pores between particles.

In a dual belt filter press of the type described herein, an increase in the hardness of the covering on the satellite rolls tends to remove more water from the cake so that a drier product results. Softer coverings, however, generally tend to provide greater throughput of material. A general purpose press of this type would usually be provided with a moderately hard cover.

Dual-belt presses specially designed for a particular product may have soft covering as high throughput is the primary objective. If low moisture content in the final product is desired, then a harder covering is preferably used.

The dual-belt filter press of the instant invention combines the advantages of both hard and soft coverings inasmuch as coverings of an increasing hardness are used.

Various materials act differently upon being subjected to pressure in the nip of a dual-belt filter press. If the material is fluid, it will be pumped by the action of a hard satellite roll against a hard primary roll. The fluidity of a cake depends upon its water content and the physical properties of the particles comprising the cake. Cellulosic materials, for example, lose their fluidity at a solids content above about 10% by weight while a clay material may be fluid at a solids content less than about 60% or 70% by weight.

The instant invention is particularly adaptable for handling a variety of cakes having different moisture contents and different particulate compositions. A fluid cake may be handled in a dual-belt press having multiple primary drums by employing a soft elastomeric covering on the first primary roll in contact with a first satellite roll having a soft covering with successive satellite rolls having slightly harder coverings to a cake for feeding to the second primary drum which is sufficiently dry as to be nonfluid. In the second primary drum, an elastomeric covering is used which is significantly harder than the covering on the first primary drum. The first satellite roll in contact with the second primary drum should have a covering which is about equal in hardness to the hardness of the covering on the second primary drum. Each successive satellite roll preferably has a covering which is harder than the preceding roll.

Utilization of conventional dewatering devices, such as a tortuous roll dual-belt dewatering system, before the dual-belt presses of the instant invention may effectively provide cakes having the appropriate solids content for feeding to the dual-belt filter press.

I claim:

1. A continuous dual-belt filter press for dewatering a filter cake comprising:

a first cylindrical primary roll having dewatering means;

at least one cylindrical first satellite roll in substantial surface contact with said first primary roll, said satellite roll having a diameter significantly smaller than said primary roll;

a pair of substantially parallel flat belts at least one of which is porous having substantial facial contact between said first primary roll and said satellite roll in contact therewith, the innermost of said belts maintaining substantial contact with the surface of said first primary roll for an arc of substantially greater than about 120° of the cylindrical surface of said primary roll;

a second cylindrical primary roll having dewatering means, said second primary roll having a diameter smaller than said first primary roll, said second and first primary rolls being in substantial contact with one another with said second primary roll positioned with respect to the first point of contact with said belts with said first primary roll that said belts wrap said first primary roll for an arc of substantially more than 120°;

at least one cylindrical second satellite roll in substantial surface contact with said second primary roll, said second satellite roll having a diameter smaller than said first satellite roll;

a third cylindrical primary roll having dewatering means, said third primary roll having a diameter smaller than said second primary roll, said third primary roll being in substantial contact with said second primary roll and circumferentially displaced from the first point of contact with said belts with said second primary roll that said belts wrap said second primary roll for an arc substantially more than 120°.

2. The dual-belt filter press of claim 1 wherein both belts are water-permeable belts.

3. The dual-belt filter press of claim 1 wherein said first primary cylindrical drum has at least three first satellite rolls in substantial contact therewith.

4. The dual-belt filter press of claim 1 wherein the ratio of diameters of said first primary drum to said first primary satellite rolls is from about 3:1 to about 4:3.

5. The dual-belt filter press of claim 1 wherein the ratio of diameters of said first primary drum to said second primary drum is about 2:1 or less.

6. The dual-belt filter press of claim 5 wherein the ratio of diameters of said second primary drum to said third primary drum is about 2:1 or less.

7. The dual-belt filter press of claim 1 wherein each of said primary rolls is covered with an elastic compressible material wherein the covering on each succeeding primary roll is harder than on the preceding primary roll.

8. The dual-belt filter press of claim 7 wherein the covering on said first primary roll has a durometer reading of about 35 to about 55.

* * * * *